(12) United States Patent
Allen, III et al.

(10) Patent No.: US 6,341,803 B1
(45) Date of Patent: Jan. 29, 2002

(54) COUPLING DEVICE

(75) Inventors: Clifford W. Allen, III, Lexington;
Theodore P. O'Canna, Versailles;
Marshall B. Reynolds, Jr., Lexington,
all of KY (US)

(73) Assignee: Lexair, Inc., Lexington, KY (US)

( * ) Notice: Subject to any disclaimer, the term of this patent is extended or adjusted under 35 U.S.C. 154(b) by 0 days.

(21) Appl. No.: 09/483,583

(22) Filed: Jan. 14, 2000

(51) Int. Cl.[7] ................................................ F16L 35/00
(52) U.S. Cl. ...................................... 285/39; 285/124.5
(58) Field of Search ........................ 137/614.04; 285/39, 285/124.1, 124.5, 316, FOR 111, FOR 118, 920

(56) References Cited

U.S. PATENT DOCUMENTS

| | | | |
|---|---|---|---|
| 3,918,492 A | * 11/1975 | Karcher et al. | 137/614.04 |
| 4,274,664 A | * 6/1981 | Thominet | 285/920 |
| 4,987,956 A | * 1/1991 | Hansen et al. | 285/920 |
| 5,464,042 A | * 11/1995 | Haunhorst | 137/614.04 X |
| 5,507,530 A | * 4/1996 | Mahaney | 285/316 X |
| 5,896,889 A | * 4/1999 | Menard | 137/614.04 |

\* cited by examiner

*Primary Examiner*—Lynne H. Browne
*Assistant Examiner*—Greg Binda
(74) *Attorney, Agent, or Firm*—Frank C. Leach, Jr.

(57) ABSTRACT

A plurality of female couplers and a plurality of male couplers are simultaneously connected or disconnected by simultaneously applying an axial force along the aligned axes of each pair of female and male couplers. A pushing force is employed for connecting, and a pulling force is utilized for disconnecting. The forces may be employed manually, pneumatically, or hydraulically.

26 Claims, 13 Drawing Sheets

COUPLING DEVICE

FIELD OF THE INVENTION

This invention relates to a coupling device for quickly connecting a plurality of first fluid conduits to a plurality of corresponding second fluid conduits and quickly disconnecting them from each other and, more particularly, to a coupling device in which a force applied in one axial direction connects multiple aligned male and female couplers to each other and a force applied in the other axial direction disconnects them.

BACKGROUND OF THE INVENTION

Manually connecting and disconnecting multiple fluid conduits through couplers is time consuming. It is sometimes difficult to accomplish the connections and disconnections because of the closeness of the multiple fluid conduits to each other. Metal chips from prior metal cutting, for example, can become stacked around the coupling device to possibly cut the skin of the person when connection or disconnection is being made.

Accordingly, various mechanical coupling devices have previously been used to connect and disconnect the fluid conduits. These mechanical coupling devices have required various complex arrangements such as pivotal levers or movable plates, for example. Examples of these types of mechanical coupling devices are found in U.S. Pat. No. 3,544,063 to Barlow et al, U.S. Pat. No. 4,247,135 to Weirich et al, U.S. Pat. No. 4,615,546 to Nash et al, U.S. Pat. No. 4,753,268 to Palau, U.S. Pat. No. 5,417,459 to Gray et al, U.S. Pat. No. 5,507,530 to Mahaney, and U.S. Pat. No. 5,992,894 to Eybergen.

SUMMARY OF THE INVENTION

The coupling device of the present invention avoids the complexity of the previously available mechanical coupling devices in that the only force required to connect or disconnect multiple male and female couplers simultaneously is applied along the axis of each of the female couplers and the aligned axis of the corresponding male coupler with which it is to be connected or disconnected. A pushing force is required to connect the multiple male and female couplers, and a pulling force is required when they are to be disconnected.

The coupling device of the present invention is used only when each of the female couplers has a slidable locking sleeve. There must be relative axial movement between the locking sleeve and the female coupler on which the locking sleeve is slidably mounted to enable activation of internal structure of the female coupler to disconnect each pair of connected multiple male and female couplers simultaneously from each other. Of course, when this is being accomplished manually, each disconnection must be made separately.

The coupling device of the present invention uses a single force applying mechanism, which is preferably a manually movable handle although any other suitable force applying mechanism may be employed such as a pneumatic or hydraulic force applying mechanism, for example, The axial forces are preferably applied directly to each of the female couplers. However, the axial forces may be applied to each of the female couplers through the male coupler to which it is coupled.

An object of this invention is to provide a coupling device for applying an axial push force to connect multiple male and female couplers to each other simultaneously and an axial pull force to disconnect multiple male and female couplers from each other simultaneously.

Another object of this invention is to provide a coupling device having an arrangement for limiting movement of female couplers in both directions when an axial push or pull force is applied to either each of the female couplers simultaneously or each of the corresponding male couplers simultaneously to connect or disconnect them.

Other objects of this invention will be readily perceived from the following description, claims, and drawings.

This invention relates to a coupling device for connecting a plurality of first fluid conduits to a corresponding plurality of second fluid conduits and for disconnecting them from each other. The coupling device includes a plurality of male couplers with each communicating with one of the plurality of first fluid conduits and a plurality of female couplers, equal in number to the number of the plurality of male couplers, communicating with one of the plurality of second fluid conduits. Each of the plurality of female couplers has a locking sleeve slidably mounted thereon for relative axial movement therebetween when each of the plurality of female couplers is to be disconnected from the connected male coupler. The coupling device has first support means for supporting the plurality of male couplers in substantially parallel axial relation to each other and second support means for supporting the plurality of female couplers in substantially parallel axial relation to each other. The second support means supports each of the plurality of female couplers for enabling axial movement of each of the plurality of female couplers along its axis relative to the second support means in either axial direction. Causing means causes simultaneous movement of each of the plurality of female couplers relative to the second support means in one axial direction when one of the first and second support means is moved relative to the other to cause engagement between each of the plurality of female couplers and the male coupler axially aligned therewith to connect them together and for causing simultaneous movement of each of the plurality of female couplers relative to the second support means in the opposite axial direction when one of the first and second support means is moved relative to the other to cause relative axial movement between each of the plurality of female couplers and the locking sleeve slidably mounted thereon to disconnect each of the plurality of female couplers and the connected male coupler.

BRIEF DESCRIPTION OF THE DRAWINGS

The attached drawings illustrate preferred embodiments of the invention, in which.

DETAILED DESCRIPTION

Figure 1:
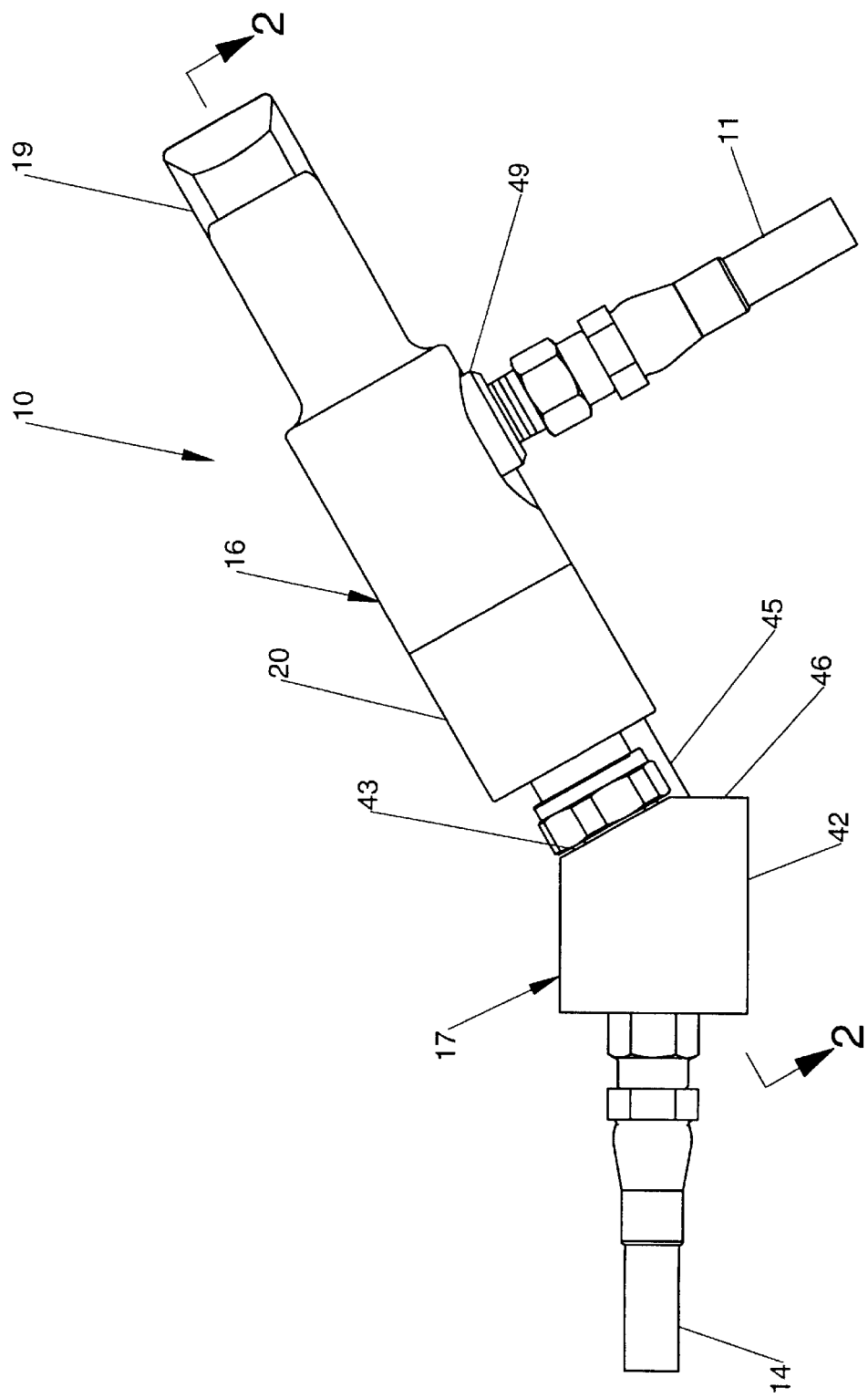
FIG. 1 is a side elevational view of one embodiment of a coupling device of the present invention.
Figure 7:
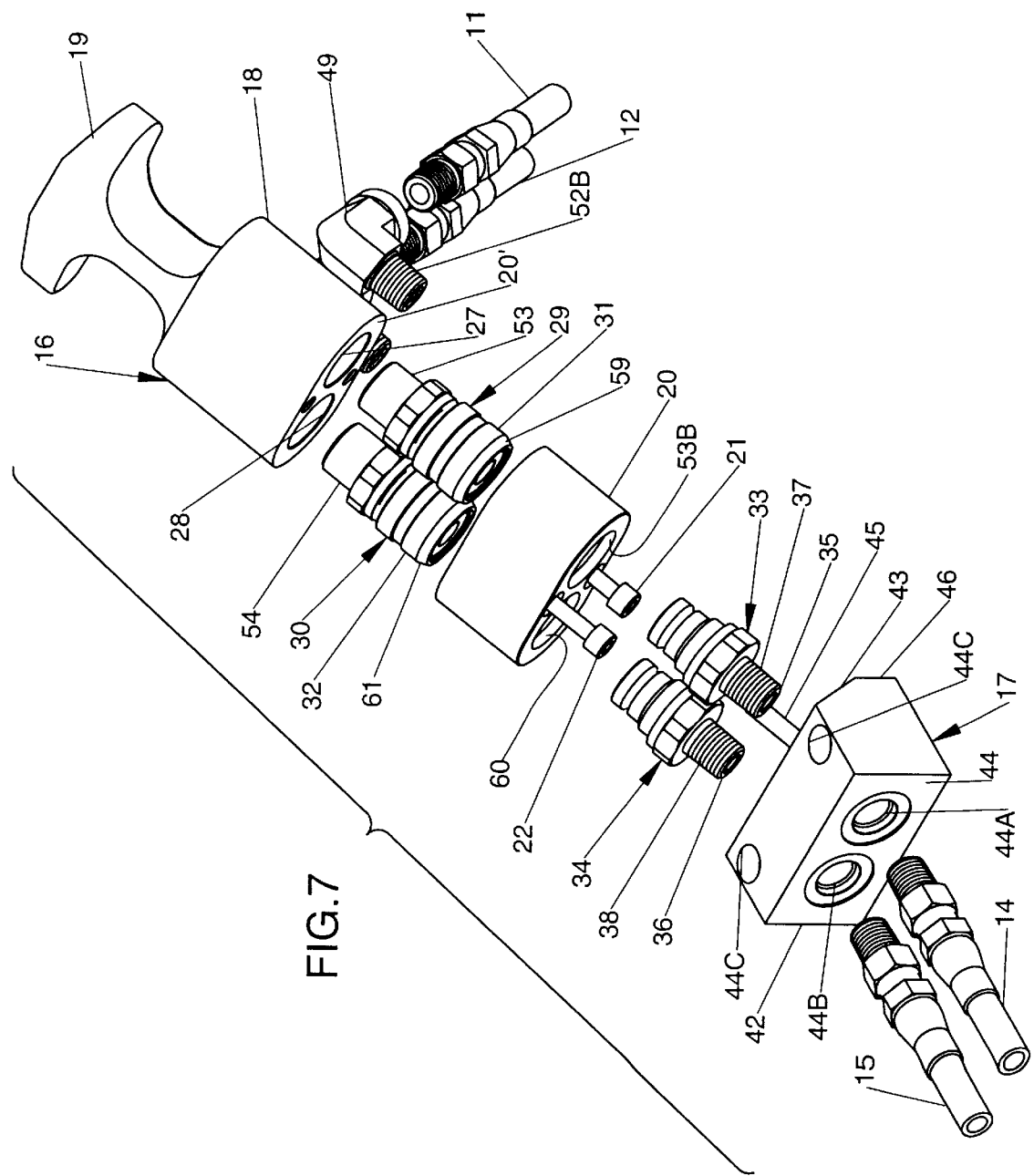
FIG. 7 is an exploded perspective view of the coupling device of FIG. 1.

Referring to the drawings and particularly FIG. 1, there is shown a coupling device 10 for coupling two fluid conduits or hoses 11 and 12 (see FIG. 7) to two fluid conduits or hoses 14 and 15. It should be understood that there may be more than the two fluid conduits 11 and 12 connected to more than the two fluid conduits 14 and 15.

The coupling device 10 includes a handle assembly 16 (see FIG. 2), which is preferably aluminum, and a receiver assembly 17, which is preferably steel. The receiver assembly 17 is fixed against movement.

Figure 6:
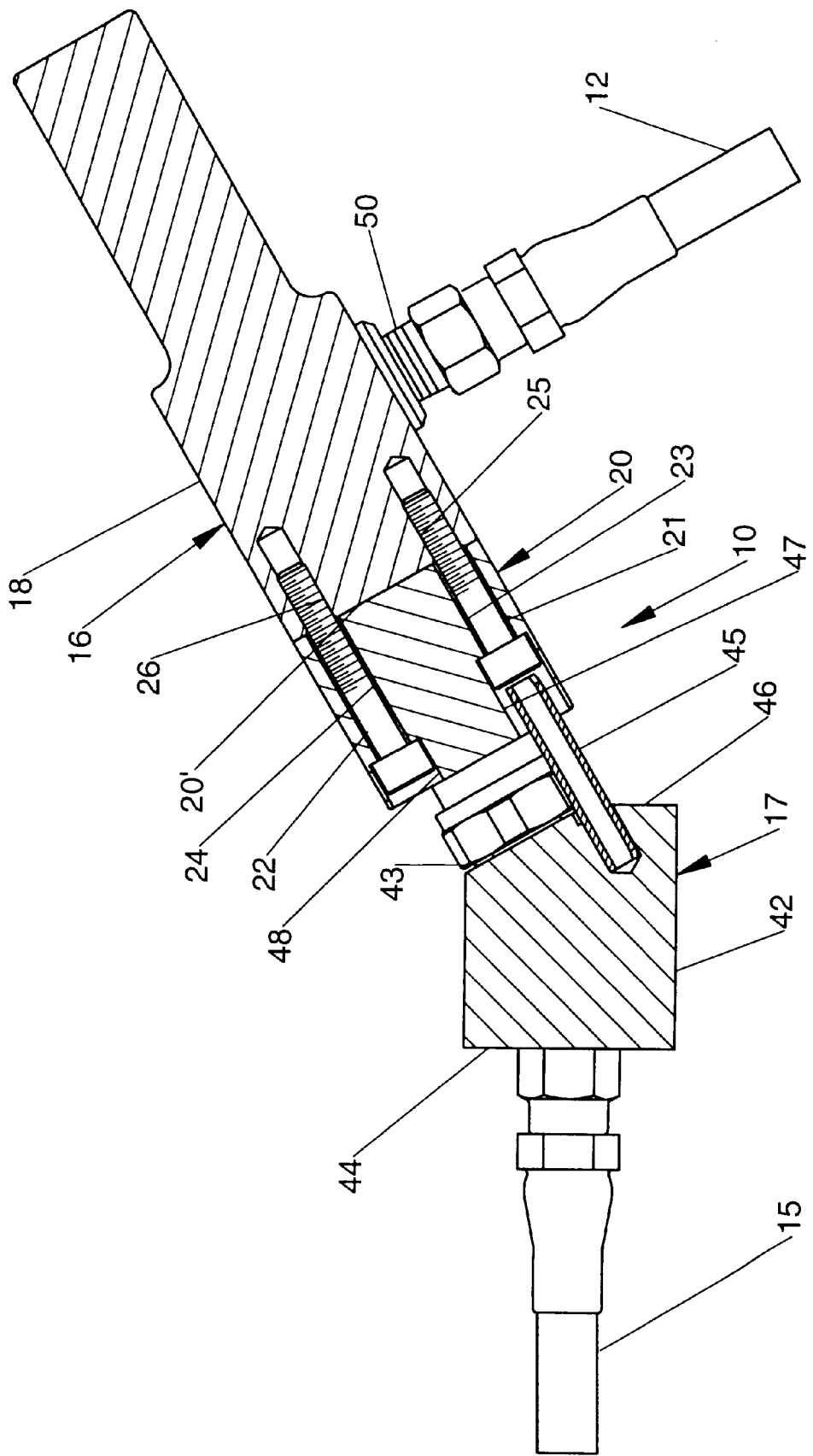
FIG. 6 is a sectional view of the coupling device of FIG. 1 and taken along line 6—6 of FIG. 5.

The handle assembly 16 includes a body 18 having a handle 19 extending from one end thereof and preferably integral with the body 18. A nose piece 20 of the handle assembly 16 is secured to end 20', which is remote from the handle 19, of the body 18 by two screws 21 (see FIG. 6) and 22. The screws 21 and 22 extend through passages 23 and 24, respectively, in the nose piece 20 and into threaded bores 25 and 26, respectively, extending into the body 18 from the end 20'.

Figure 2:
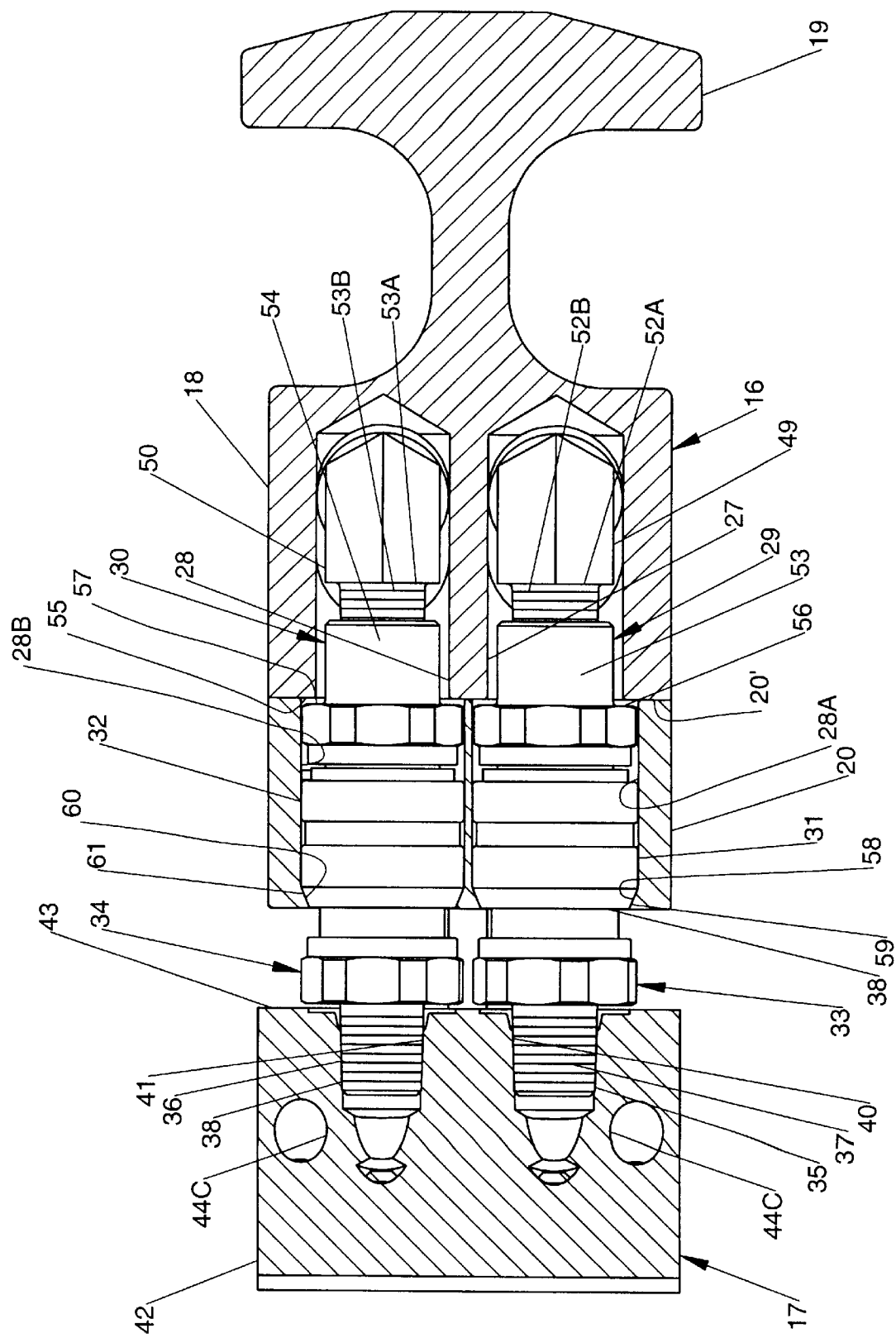
FIG. 2 is a sectional view of the coupling device of FIG. 1 and taken along line 2—2 of FIG. 1.
Figure 3:
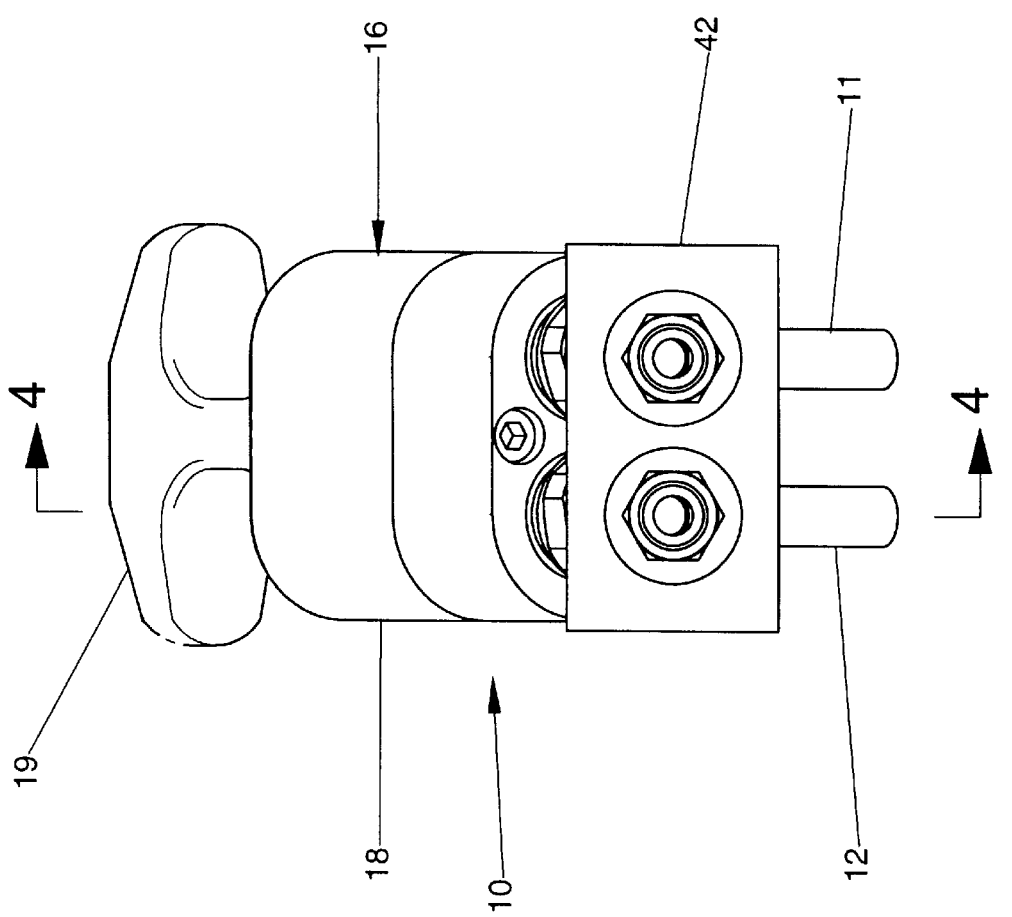
FIG. 3 is an end elevational view of the coupling device of FIG. 1.
Figure 4:
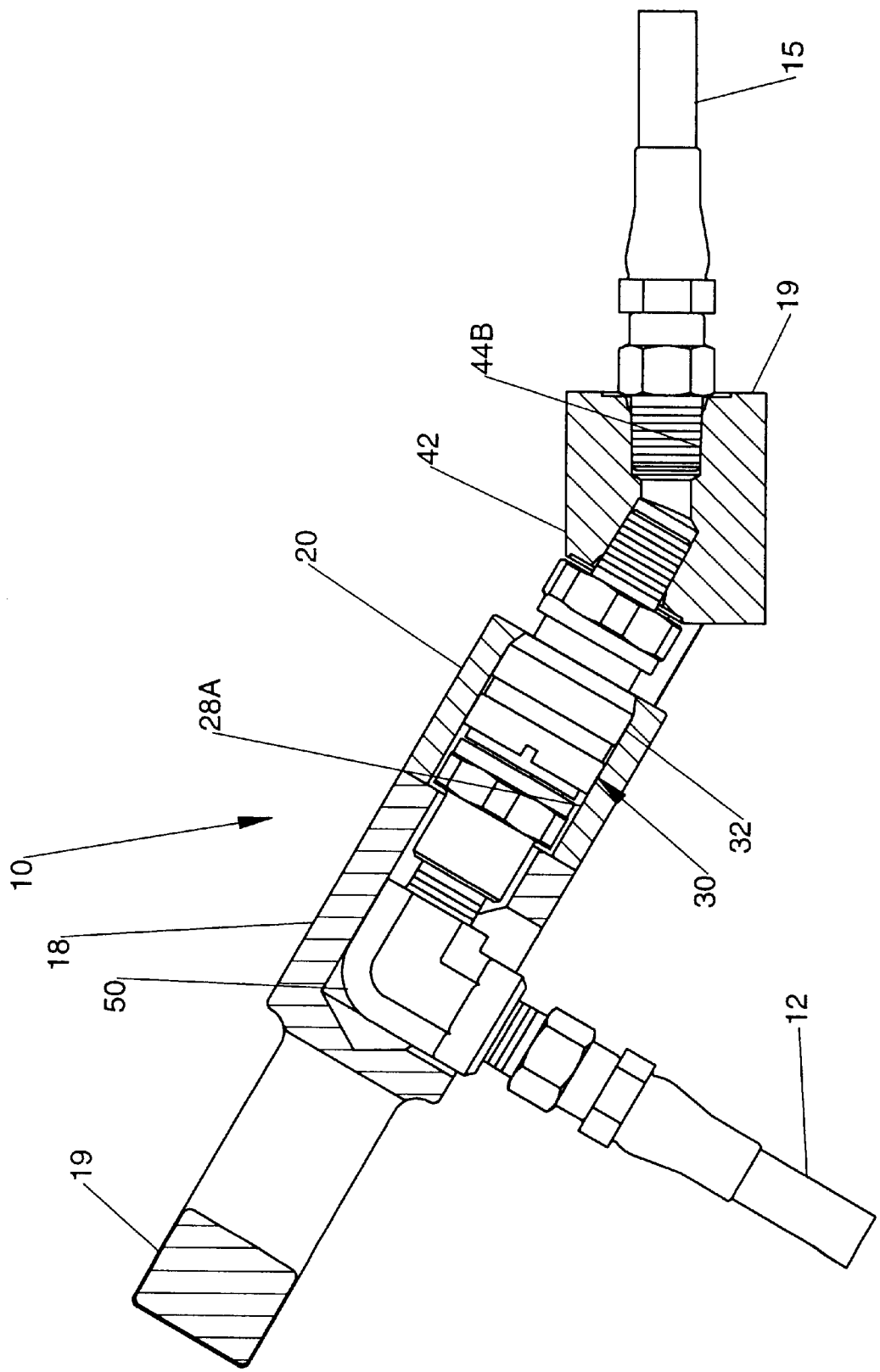
FIG. 4 is a sectional view of the coupling device of FIG. 1 and taken along line 4—4 of FIG. 3.

The body 18 has a pair of substantially parallel bores 27 (see FIG. 7) and 28 extending inwardly from the end 20'. As shown in FIG. 2, the bores 27 and 28 communicate with bores 28A and 28B, respectively, of larger diameter in the nose piece 20 when the body 18 and the nose piece 20 are secured to each other.

The bores 27 and 28A receive a female coupler 29, and the bores 28 and 28B receive a female coupler 30. While only the two female couplers 29 and 30 are shown, it should be understood that the handle body 18 could have any number of additional bores to receive additional female couplers, if desired.

The two female couplers 29 and 30 have locking sleeves 31 and 32, respectively, slidably mounted thereon. The two female couplers 29 and 30 receive male couplers 33 and 34, respectively, in one of their ends for coupling therebetween. The slidable locking sleeves 31 and 32 must be moved axially relative to the two female couplers 29 and 30, respectively, to activate the internal structures of the two female couplers 29 and 30, respectively, to disconnect them from the male couplers 33 and 34, respectively.

The two male couplers 33 and 34 have reduced cylindrical portions 35 and 36, respectively, with external threads 37 and 38, respectively, thereon. The external threads 37 and 38 enable the two male couplers 33 and 34, respectively, to be threaded into threaded holes 40 and 41, respectively, in a receiver block 42 of the receiver assembly 17. The receiver block 42 has the threaded holes 40 and 41 extending inwardly from an inclined front face 43 (see FIG. 7).

The fluid conduits 14 and 15 extend from a rear face 44 of the receiver block 42. The fluid couplers 14 and 15 communicate with bores 44A and 44B, respectively, in the receiver block 42. The receiver block 42 is fixed to a work holding pallet, for example, by screws (not shown) extending through passages 44C in the receiver block 42.

The receiver block 42 has a locator pin 45 (see FIG. 6) extending therefrom at the intersection of the inclined front face 43 and a straight front face 46. The locator pin 45 extends into the passage 23 in the nose piece 20. The passage 23 has a larger portion 47 extending for a greater length than a larger portion 48 of the passage 24 to receive the locator pin 45 with the screw 21 having a shorter length than the screw 22.

This arrangement insures the correct orientation of the handle assembly 16 (see FIG. 7) relative to the receiver assembly 17. This orientation is necessary to insure that the fluid conduit 11, which is connected with a source of hydraulic fluid, for example, is connected to the fluid conduit 14. This also insures that the fluid conduit 15 is connected with the fluid conduit 12 to return the fluid to a reservoir or inlet of a pump, for example.

Figure 5:
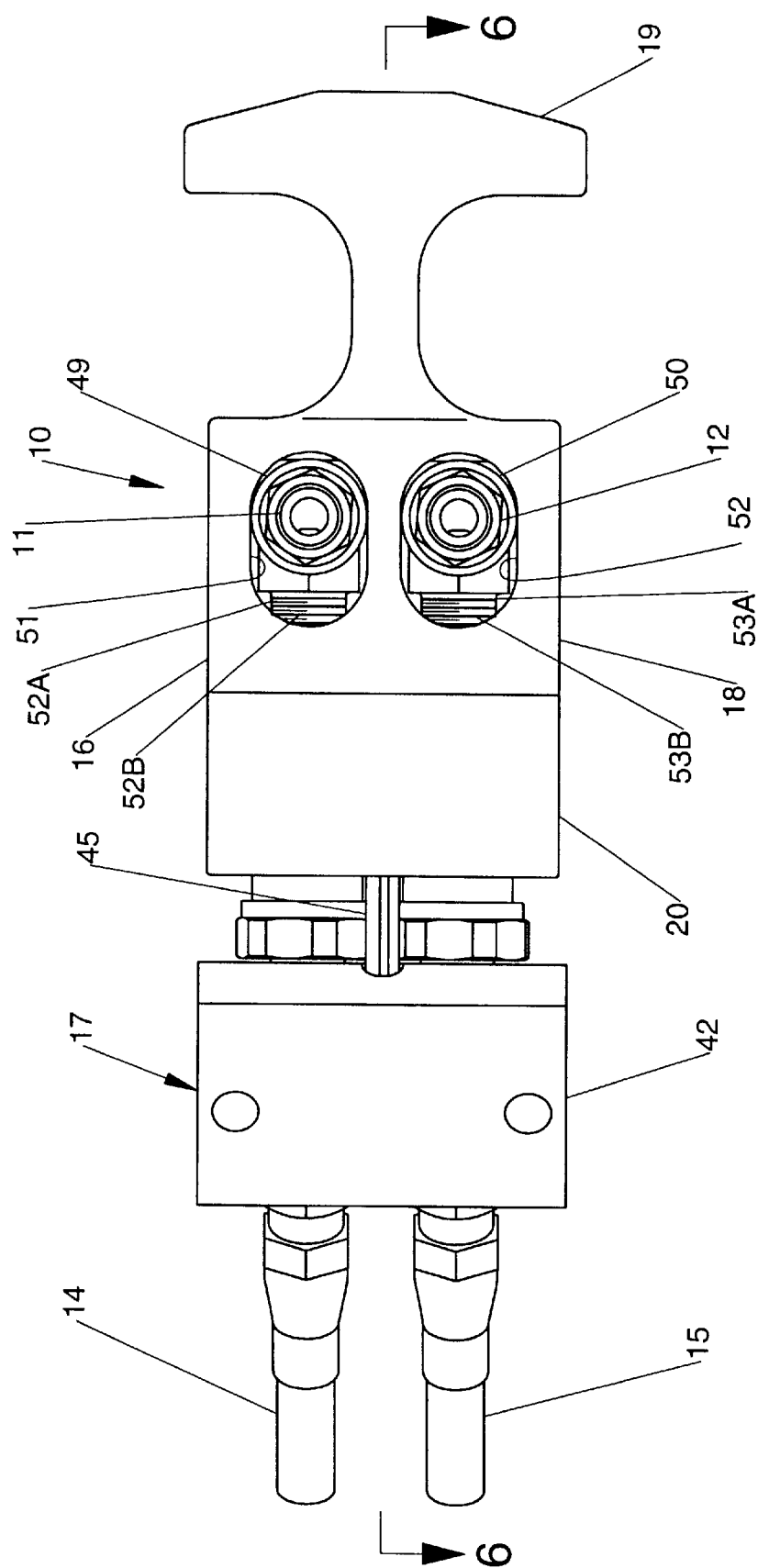
FIG. 5 is a bottom plan view of the coupling device of FIG. 1.

The female couplers 29 and 30 are connected to hollow elbow fittings 49 (see FIG. 5) and 50, respectively. The elbow fitting 49 is disposed in the bore 27 (see FIG. 2) in the body 18 and extends through an elongated slot 51 (see FIG. 5) in the outer bottom wall of the body 18 for connection to the fluid conduit 11. The elbow fitting 50 is disposed in the bore 28 (see FIG. 2) in the body 18 and extends through an elongated slot 52 (see FIG. 5) in the outer bottom wall of the body 18 for connection to the fluid conduit 12.

One end of the elbow fitting 49 is a reduced cylindrical portion 52A having external threads 52B for cooperation with internal threads 52C (see FIG. 11) in a reduced cylindrical portion 53 of the female coupler 29 to connect the female coupler 29 with the fluid conduit 11 (see FIG. 1). One end of the elbow fitting 50 (see FIG. 2) is a reduced cylindrical portion 53A having external threads 53B for cooperation with internal threads in a reduced cylindrical portion 54 of the female coupler 30 to connect tie female coupler 30 with the fluid conduit 12 (see FIG. 7).

The nose piece 20 has an inclined inner surface 58 at the end of the bore 28A for cooperation with an inclined surface 59 on the end of the locking sleeve 31 of the female coupler 29. The nose piece 20 has an inclined inner surface 60 at the end of the bore 28B for cooperation with an inclined surface 61 on the end of the locking sleeve 32 of the female coupler 30.

When the female couplers 29 and 30 are to be disconnected, from the male couplers 33 and 34, respectively, the handle 19 is pulled to the right in FIG. 2. When the inclined inner surface 58 on the nose piece 20 engages the inclined surface 59 of the locking sleeve 31 of the female coupler 29 and the inclined inner surface 60 on the nose piece 20 engages the inclined surface 61 of the locking sleeve 32 of the female coupler 30 due to pulling the handle 19 to the right in FIG. 2, an axial force is applied simultaneously to the locking sleeves 31 and 32. This simultaneously moves the locking sleeves 31 and 32 relative to the female couplers 29 and 30, respectively, to disconnect the female couplers 29 and 30 from the male couplers 33 and 34, respectively.

As shown in FIG. 2, the body 18 has its outer wall of a thicker cross section than the outer wall of the nose piece 20 because each of the bores 27 and 28 has a smaller diameter than each of the bores 28A and 28B. This produces an annular shoulder 55 on the end 20' of the body 18.

Figure 11:
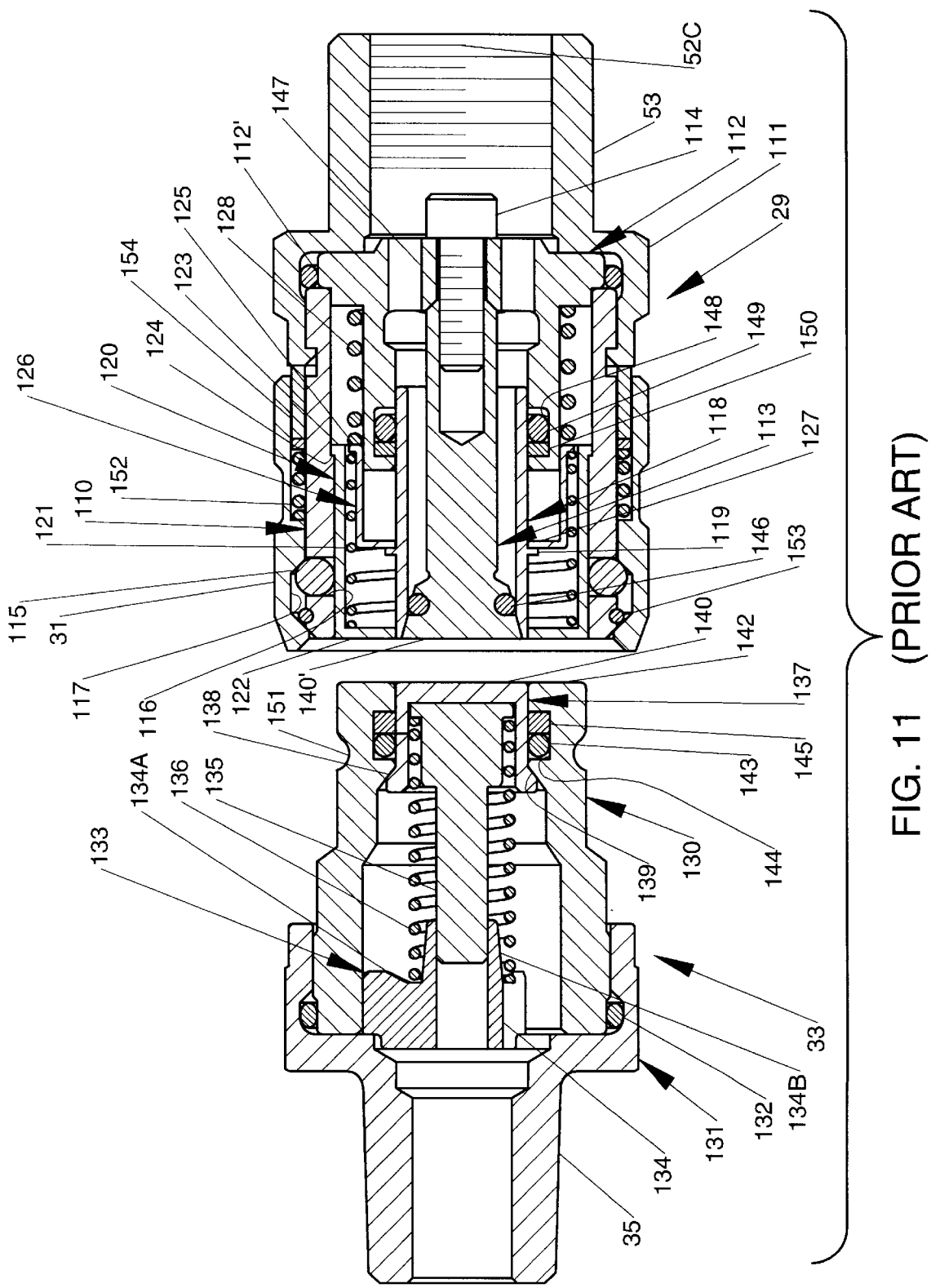
FIG. 11 is a sectional view of a female coupler and a male coupler used with the coupling device of the present invention.

Accordingly, with the female couplers 29 and 30 disconnected from the male couplers 33 and 34, respectively, as shown in FIG. 11 for the female coupler 29 and the male coupler 33, when the handle 19 is pushed to the left in FIG. 2, the shoulder 55 engages an annular face 56 of the female coupler 29 and an annular face 57 of the female coupler 30. The remainder of each of the annular faces 56 and 57 engages portions of the end 20' of the body 18 when they are engaging the shoulder 55.

This arrangement limits movement of each of the female couplers 29 and 30 relative to the body 18 and the nose piece 20, which constitute two separate connected portions of a housing for the female couplers 29 and 30. Thus, the spacing of the shoulder 55 and the end 20' of the body 18 from each of the annular faces 56 and 57 of the female couplers 29 and 30, respectively, limits movement of the female couplers 29 and 30 relative to the body 18 and the nose piece 20 during connection of the female couplers 29 and 30 to the male couplers 33 and 34, respectively.

Thus, it is only necessary to exert a push force on the handle 19 along the axial direction of the two female couplers 29 and 30 to simultaneously connect them to the male couplers 33 and 34, respectively. To disconnect them, it is only necessary to exert a pull force in the opposite axial direction on the two locking sleeves 31 and 32 and through them to the two female couplers 29 and 30, respectively, to simultaneously disconnect them from the male couplers 33 and 34, respectively.

One suitable example of the two female couplers 29 and 30 is sold by Quick Coupling Division, Parker Fluid Connectors, Lincoln, Neb. as model FF-251-4FP. It should be understood that any other suitable female coupler having the capability of being disconnected from a male coupler by axial movement of a locking sleeve or the like may be employed.

One suitable example of the two male couplers 33 and 34 is sold by Quick Coupling Division, Parker Fluid Connectors, Lincoln, Neb. as model FF-252-4MP. It should be understood that any other suitable male coupler, which would mate with a corresponding female coupler may be employed.

Figure 8:
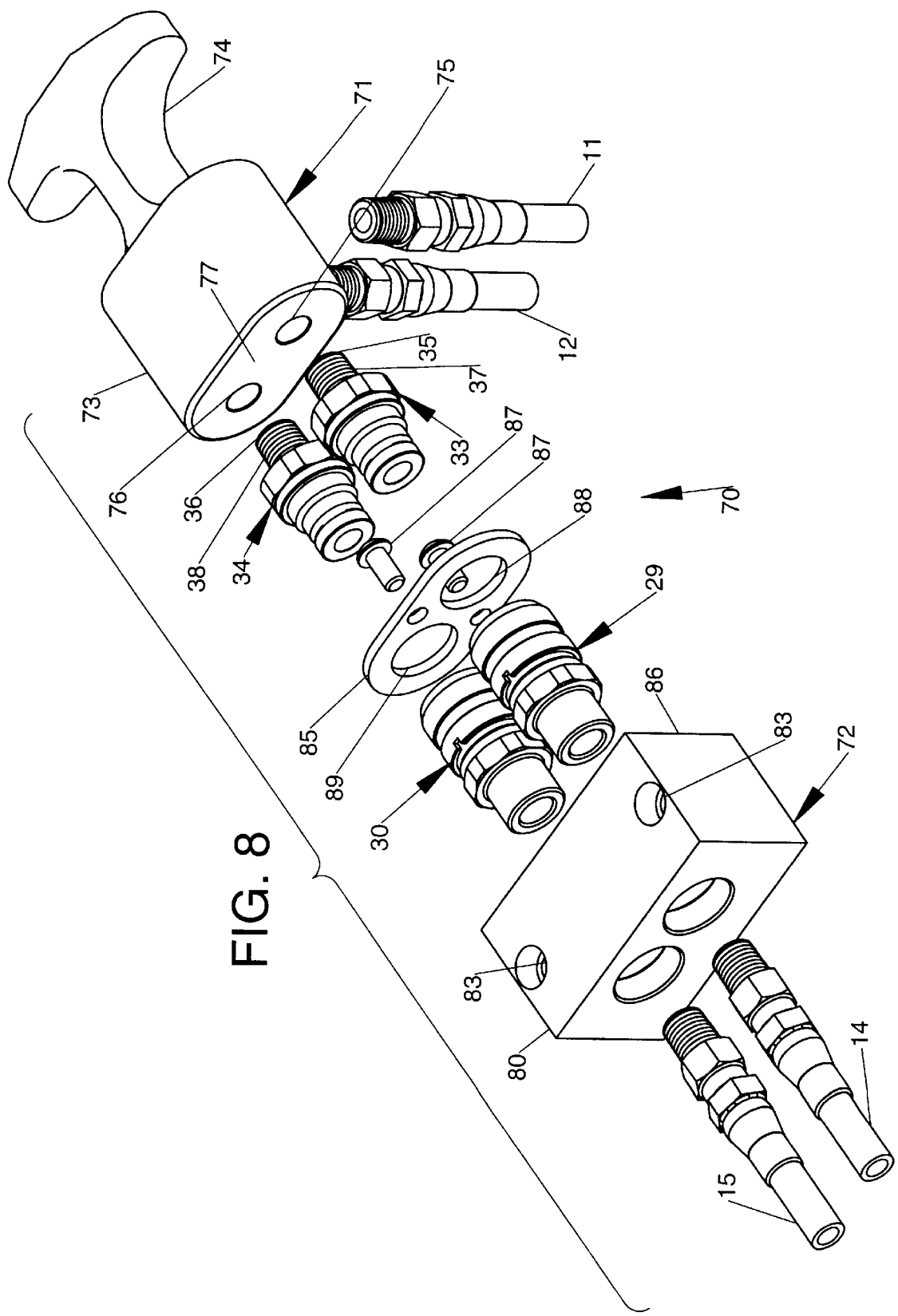
FIG. 8 is an exploded perspective view of another embodiment of the coupling device of the present invention.

Referring to FIG. 8, there is shown a coupling device 70 for connecting the two female couplers 29 and 30 to the male couplers 33 and 34, respectively, and disconnecting them. The coupling device 70 includes a handle assembly 71, which is preferably aluminum, and a receiver assembly 72, which is preferably steel.

The handle assembly 71 includes a body 73 having a handle 74 extending from one end thereof and preferably integral with the body 73. The body 73 has a pair of substantially parallel threaded bores 75 and 76 extending inwardly from its end 77, which is remote from the handle 74.

Figure 10:
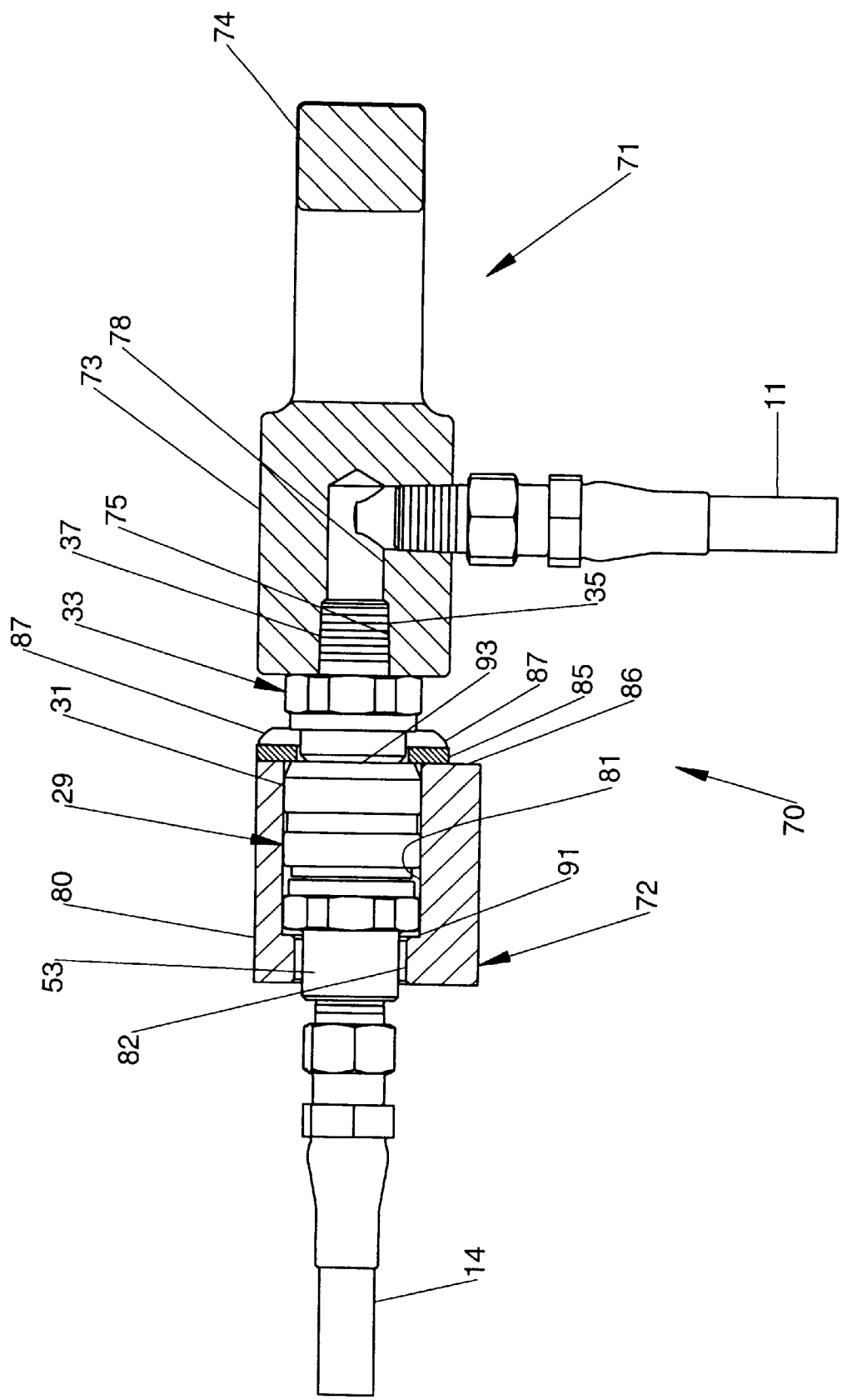
FIG. 10 is a sectional view of the coupling device of FIG. 8 and taken along line 10—10 of FIG. 9.

As shown in FIG. 10, the threaded bore 75 receives the external threads 37 of the reduced cylindrical portion 35 of the male coupler 33 to connect the male coupler 33 to the body 73. The threaded bore 76 (see FIG. 8) receives the external threads 38 of the reduced cylindrical portion 36 of the male coupler 34 to connect the male coupler 34 to the body 73.

The body 73 has a bore 78 (see FIG. 10), which is smaller than the threaded bore 75, to communicate the interior of the male coupler 33 with the fluid conduit 11. The male coupling 34 (see FIG. 8) has its interior similarly communicating with the fluid conduit 12.

The receiver assembly 72 includes a receiver block 80 (see FIG. 10) having a bore 81 to receive the female coupling 29. The reduced cylindrical portion 53 of the female coupling 29 is disposed within a bore 82, which is smaller than the bore 81, in the receiver block 80. The receiver block 80 is fixed to a work holding pallet, for example, by screws (not shown) extending through passages 83 (see FIG. 8) in the receiver block 80.

A retaining cover 85 is attached to a front wall 86 of the receiver block 80 by screws 87. The receiver block 80 and the retaining cover 85 constitute two separate connected portions of a housing for the female couplers 29 and 30.

The retaining cover 85 has a pair of openings 88 and 89 therein to receive portions of the female couplers 29 and 30, respectively, and portions of the male couplers 33 and 34, respectively. Each of the openings 88 and 89 has a larger diameter than the smallest diameter of the male couplers 33 and 34, respectively, so that the male couplers 33 and 34 may be moved therethrough to engage the ends of the female couplers 29 and 30, respectively, in axial alignment therewith when the handle 74 is grasped and the handle assembly 71 pushed toward the receiver assembly 72.

As shown in FIG. 10, a shoulder 91 is formed at the end of .the larger bore 81 in the receiver block 80. When the handle assembly 71 is moved to the left in FIG. 10, the movement of the female coupler 29 is limited by engagement with the shoulder 91. When this engagement occurs, the motion of the handle assembly 71 is stopped, and the male coupler 33 is connected to the female coupler 29 with their interiors communicating.

Of course, both of the male couplers 33 and 34 (see FIG. 9) are simultaneously moved when the handle assembly 71 is pushed to the left in FIG. 10. This also connects the male coupler 34 (see FIG. 8) to the female coupler 30 with their interiors communicating.

When the female couplers 29 and 30 are to be disconnected from the male couplers 33 and 34, respectively, the handle assembly 71 is pulled to the right in FIG. 10. This causes an end surface 93 of the locking sleeve 31 of the female coupler 29 to engage the retaining cover 85. As a result, further movement of the handle assembly 71 to the right in FIG. 10 causes axial motion of the remainder of the female coupler 29 relative to the locking sleeve 31. This relative motion between the remainder of the female coupler 29 and the locking sleeve 31 again causes activation of the internal structure of the female coupler 29 to disconnect the female coupler 29 from the male coupler 33 whereby the interiors of the female coupler 29 and the male coupler 33 are closed before disconnection. The same arrangement for disconnection of the female coupler 30 (see FIG. 8) from the male coupler 34 occurs simultaneously.

Figure 12:
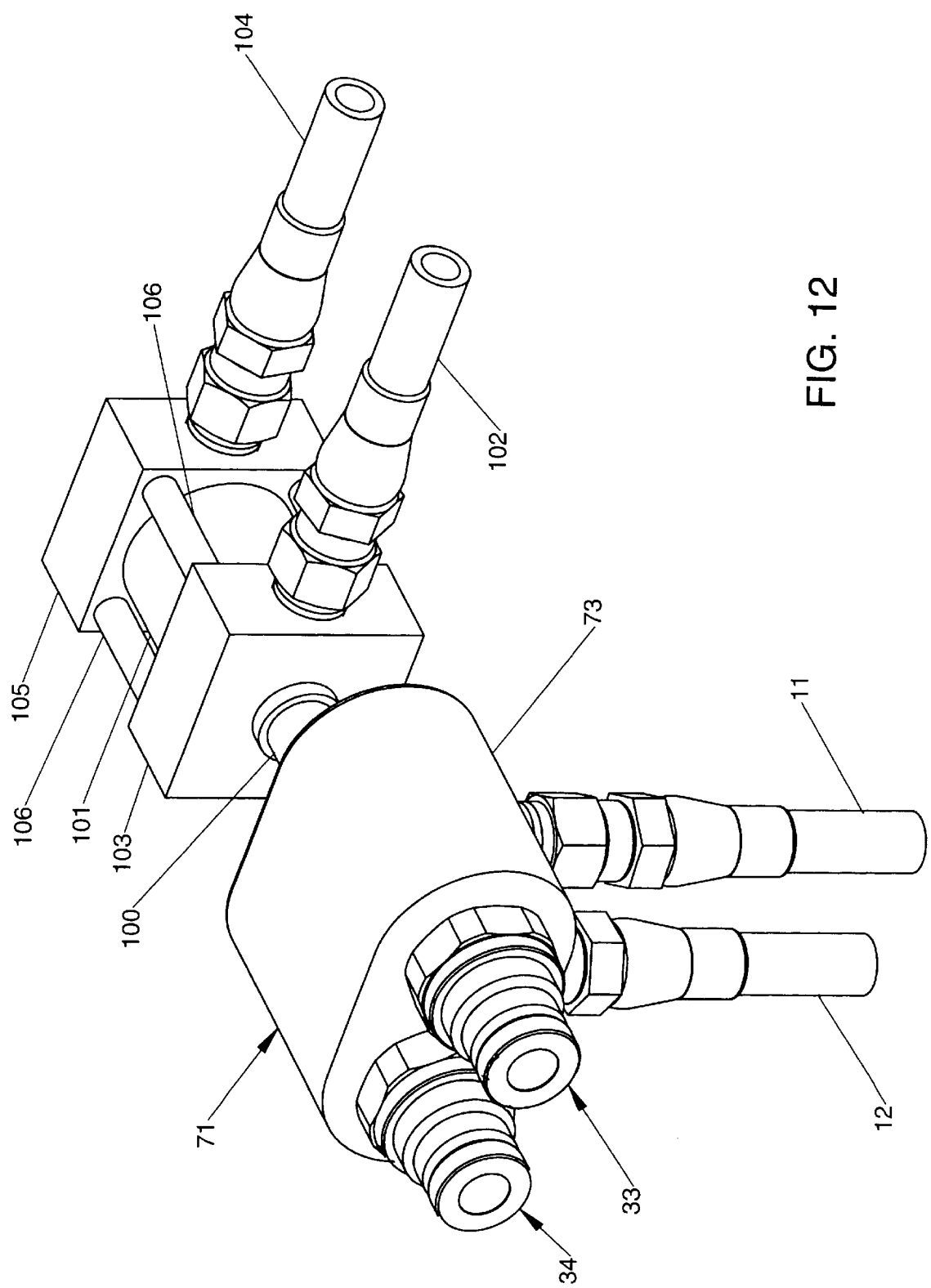
FIG. 12 is a perspective view of another arrangement for applying axial forces to the female and male couplers of the coupling device of FIGS. 8–10 of the present invention.

Instead of using the handle 74 with the handle body 73 of the handle assembly 71, one end of a piston rod 100 (see FIG. 12) is connected to the handle body 73, which has the male couplers 33 and 34 mounted therein, for moving the handle body 73 in each axial direction. The piston rod 100 has its other end connected to a piston (not shown) movable in a cylinder 101.

A fluid conduit 102 is connected through a head 103, which is at one end of the cylinder 101, with the cylinder 101 on one side of the piston (not shown). A fluid conduit 104 is connected through a cap 105, which is at the opposite end of the cylinder 101 from the head 103, with the cylinder 101 on the opposite side of the piston (not shown). The head 103 and the cap 105 are held together by tie rods 106.

One of the fluid conduits 102 and 104 applies pressure, either pneumatic, such as air, for example, or hydraulic, to one side of the piston (not shown) in the cylinder 101. The other of the fluid conduits 102 and 104 removes the air or hydraulic fluid to cause movement of the piston rod 100 in one of the two axial directions. Reversal of the flow through the fluid conduits 102 and 104 causes movement of the piston rod 100 in the opposite axial direction.

Figure 9:
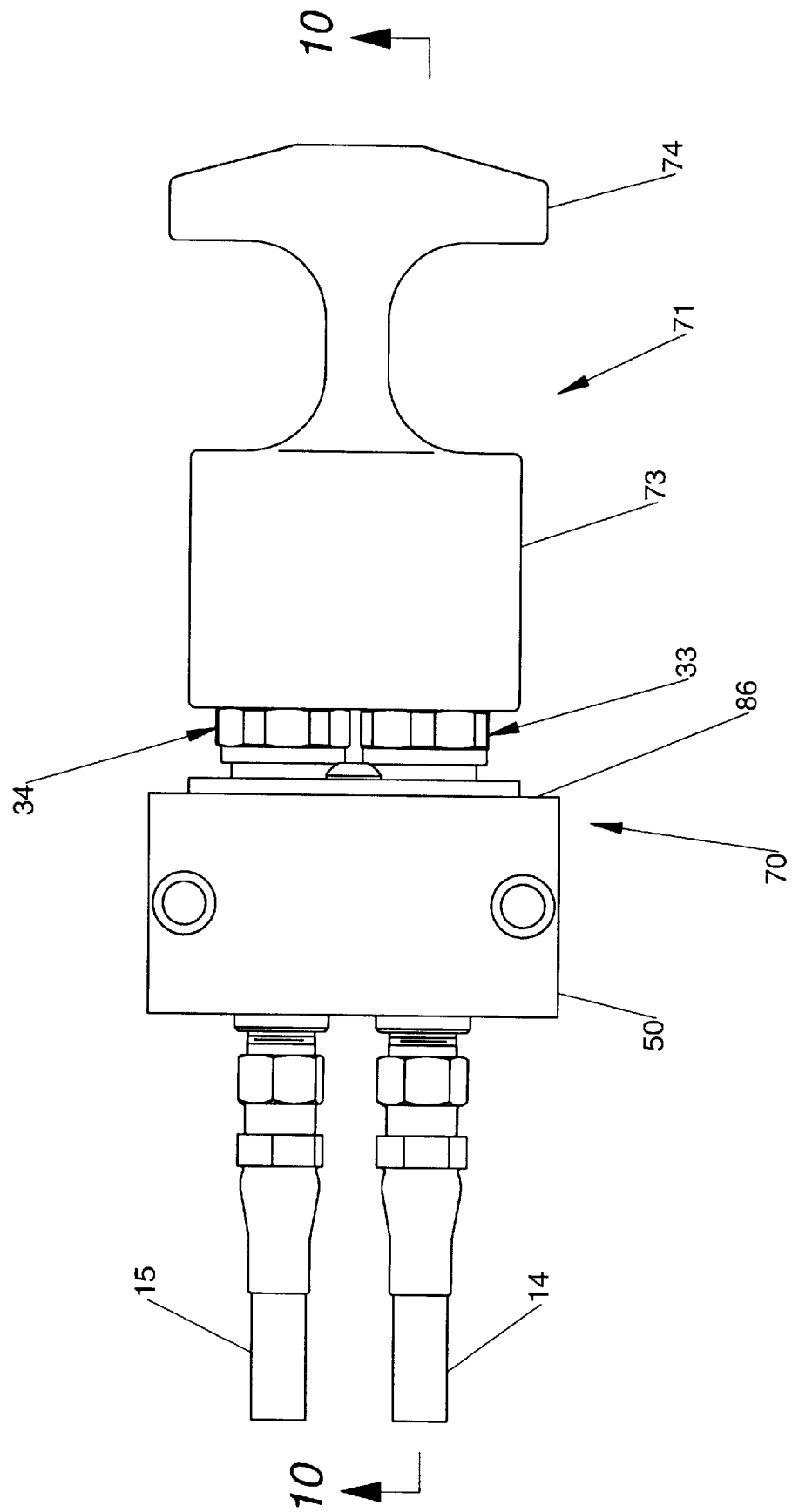
FIG. 9 is a top plan view of the coupling device of FIG. 8.

Thus, the axial movement of the male couplers 33 and 34 in either direction causes movement of the female couplers 29 and 30, respectively, in the same direction as discussed with respect to the embodiment of FIGS. 8–10.

Figure 13:
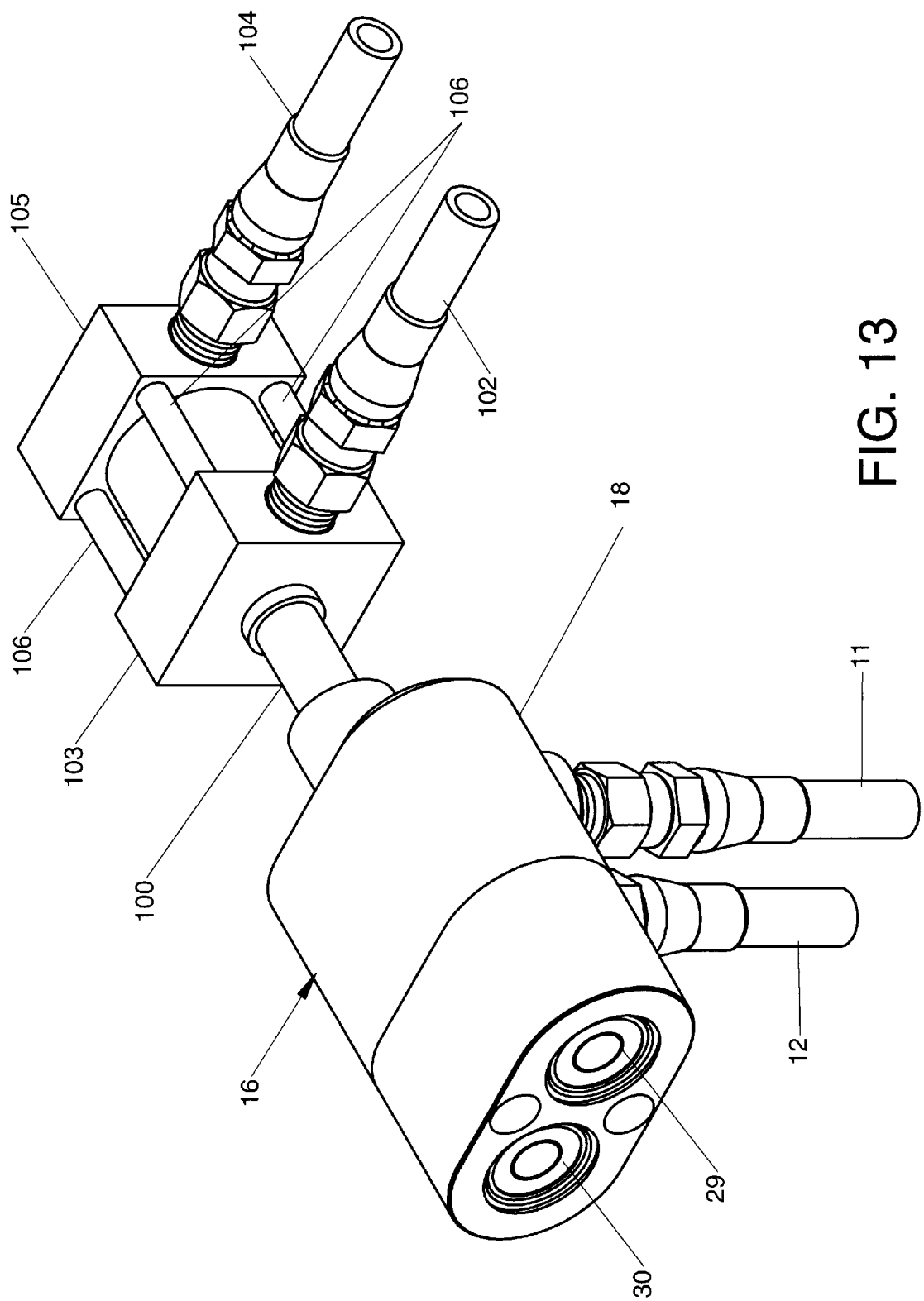
FIG. 13 is a perspective view of a further arrangement for applying axial forces to the female and male couplers of the coupling device of FIGS. 1–7 of the present invention.

It should be understood that the handle 19 (see FIG. 1) of the handle body 16 could be replaced by the piston rod 100 (see FIG. 12) in the same manner as described for the embodiment of FIGS. 8–10. Thus, as shown in FIG. 13, the piston rod 100 has replaced the handle 19 (see FIG. 1) and is connected to the handle body 16.

An example of each of the female couplers 29 (see FIG. 7) and 30 having the locking sleeves 31 and 32, respectively, slidably mounted thereon is the female coupler sold by Parker Fluid Connectors as model FF-251-4FP. As shown in FIG. 11, the female coupler 29 includes a body 110 fixed to a fitting 111 having the reduced cylindrical portion 53, which is disposed in the bore 27 (see FIG. 7) in the body 16.

A retainer 112 (see FIG. 11) is fixed to the fitting 111. A sealing ring 112' is disposed between the body 110, the fitting 111, and the retainer 112 to prevent fluid leakage therebetween. A fixed valve assembly 113 is fixed to the retainer 112 by a screw 114.

The locking sleeve 31 is slidably mounted on the body 110. Balls 115 are disposed in holes 116 in the body 110 and extend into an annular groove 117 in the inner surface of the locking sleeve 31 to connect the locking sleeve 31 and the body 110 for axial movement of the locking sleeve 31 relative to the body 110.

The valve assembly 113 is surrounded by a movable sleeve 118. The movable sleeve 118 has an annular finger 119 on its outer surface.

The female coupler 29 has a face sleeve 120 in surrounding relation to the movable sleeve 118. In its closed position of FIG. 11, the face sleeve 120 is urged by a face spring 121 to its forwardmost position in which its face 122 has its end adjacent the end of the movable sleeve 118. A flange 123 on the inner end of the face sleeve 120 engages a shoulder 124 on the inner surface of the body 110 to limit outward movement of the face sleeve 120 by the face spring 121.

The other end of the face spring 121 acts against a flange 125 of a face retainer 126. A second flange 127 of the face retainer 126 abuts the annular finger 119 on the movable sleeve 118.

A sleeve spring 128 acts on the flange 125 of the face retainer 126 to urge the second flange 127 of the face retainer 126 into engagement with the annular finger 119 on the movable sleeve 118. The sleeve spring 128 has its other end engaging the retainer 112.

An example of the male couplers 33 and 34 (see FIG. 7) is the male coupler sold by Parker Fluid Connectors as model FF-252-4MP. As shown in FIG. 11, the male coupler 33 includes a nose piece 130 having a fitting 131 attached thereto with a sealing ring 132 therebetween.

The fitting 131 includes the reduced cylindrical portion 35. A guide 133 has a plurality of passages 134 extending therethrough between equiangularly spaced portions 134A, which secure a cylindrical guide portion 134B to the nose piece 130. Thus, the passages 134 are equiangularly spaced around the axis of the male coupler 33.

A poppet stem 135 is slidably supported within the cylindrical guide portion 134B of the guide 133. The poppet stem 135 is surrounded by a spring 136, which continuously urges the poppet stem 135 into engagement with a poppet valve 137. The forward or outward motion of the poppet valve 137 is stopped by an inclined rear portion 138 of the poppet valve 137 engaging an inclined surface 139 of the nose piece 130.

When there is relative axial motion between the male coupler 33 and the female coupler 29, the poppet valve 137 has its face 140 engaged by an end face 140' of the fixed valve assembly 113 of the female coupler 29. At the same time, the face sleeve 120 has its face 122 engaged by end face 142 of the nose piece 130 of the male coupler 33.

The continued relative axial motion between the male coupler 33 and the female coupler 29 causes the poppet valve 137 to be moved inwardly against the force of the spring 136. A sealing ring 143 is disposed in an annular groove 144 in the inner surface of the nose piece 130 to provide a seal therebetween. The annular groove 144 also has a back-up washer 145 therein and acting against the sealing ring 143. Thus, no fluid flow can occur into or out of the male coupler 33 until the face 140 of the poppet valve 137 is moved inwardly past the sealing ring 143.

The engagement of the face 122 of the face sleeve 120 with the end face 142 of the nose piece 130 causes the face sleeve 120 to move against the forces of the spring 128 and the spring 121. This initial inward motion of the face sleeve 120 compresses the spring 121.

Continued inward motion of the face sleeve 120 results in the face 122 engaging the annular flange 119 on the sleeve 118. This engagement causes rearward motion of the sleeve 118 past a sealing ring 146 in the fixed valve assembly 113 to allow fluid to flow inside of the sleeve 118 and the retainer 112. Then, the fluid flows through a plurality of equiangularly spaced passages 147 in the end of the retainer 112 and into the interior of the reduced cylindrical portion 53. An annular groove 148 in the interior surface of the retainer 112 has a sealing ring 149 and a back-up washer 150 to prevent fluid leakage between the fitting 112 and the movable sleeve 118.

About the same time, an annular groove 151 in the outer surface of the nose piece 130 lines up with the balls 115 in the holes 116 extending through the body 110. Since the face sleeve 120 has moved past the holes 116 extending through the body 110, the balls 115 fall out of the annular groove 117 in the inner surface of the locking sleeve 31 into the annular groove 151 in the outer surface of the nose piece 130. This not only connects the female coupler 29 to the male coupler 33 but also allows the locking sleeve 31 to be moved forwardly relative to the body 110 by a spring 152 since the balls 115 are no longer held in the annular groove 117 in the locking sleeve 31.

A locking ring 153 on the outer surface of the body 110 limits the forward movement of the locking sleeve 31 by the spring 152. The spring 152 also acts against a spacer 154, which is fixed to the body 110.

Accordingly, fluid flow occurs between the interior of the female coupler 29 and the male coupler 33 until just prior to their disconnection from each other.

When the female coupler 29 and the male coupler 33 are to be disconnected from each other, the locking sleeve 31 must be moved rearwardly in an axial direction against the force of the spring 152. As the locking sleeve 31 moves rearwardly, the balls 115 enter the annular groove 117 in the inner surface of the locking sleeve 31 because of the face sleeve 120 returning to the position of FIG. 11. This removes the balls 115 from the annular groove 151 in the nose piece 130 of the male coupler 33.

Each of the male coupler 33 and the female coupler 29 returns to its closed and disconnected positions in the reverse order to that described for connecting them and moving them to their open flow positions.

The Parker female coupler has a tab to cooperate with one of two diametrically disposed slots in the locking sleeve when axial motion of the locking sleeve is desired to unlock the connected female and male couplers. The tab prevents accidental axial motion of the locking sleeve by not being within either slot when the female and male couplers are connected. The tab is removed from the female couplers 29 and 30 (see FIG. 7) because the female couplers 29 and 30 are within the body 18, for example, so that the tab could not return to the slot when disconnection is desired if it were to accidentally escape alignment with the slot.

An advantage of this invention is that multiple couplers may be connected or disconnected with one hand. Another advantage of this invention is that only a quick pulling force is required to manually disconnect multiple couplers quickly and safely. A further advantage of this invention is that a user will not be injured by stacked metal chips.

For purposes of exemplification, particular embodiments of the invention have been shown and described according to the best present understanding thereof. However, it will be apparent that changes and modifications in the arrangement and construction of the parts thereof may be resorted to without departing from the spirit and scope of the invention.

We claim:

1. A coupling device for connecting a plurality of first fluid conduits to a corresponding plurality of second fluid conduits and for disconnecting them from each other including:

plurality of male couplers, each of said plurality of male couplers communicating with one of the plurality of first fluid conduits;

a plurality of female couplers equal in number to the number of said plurality of male couplers, each of said plurality of female couplers communicating with one of the plurality of second fluid conduits;

each of said plurality of female couplers having a locking sleeve slidably mounted thereon for relative axial movement between said locking sleeve and said female coupler on which said locking sleeve is slidably mounted when each of said plurality of female couplers is to be disconnected from said connected male coupler;

first support means for supporting said plurality of male couplers in substantially parallel axial relation to each other;

second support means for supporting said plurality of female couplers in substantially parallel axial relation to each other;

said second support means supporting each of said plurality of female couplers for enabling only relative axial movement between said second support means and each of said plurality of female couplers in either axial direction and for enabling relative axial movement between said second support means and each of said plurality of locking sleeves only in the same axial direction as said female coupler on which said locking sleeve is slidably mounted;

causing means for causing simultaneous relative movement between said second support means and each of said plurality of female couplers so that each of said plurality of female couplers moves only in one axial direction when one of said first support means and said second support means is moved relative to the other to cause engagement between each of said plurality of female couplers and said male coupler axially aligned therewith to connect them together and for causing simultaneous relative movement between said second support means and each of said plurality of female couplers only in the opposite axial direction when said movable one of said first support means and said second support means is moved relative to the other to cause relative axial movement between each of said plurality of female couplers and said locking sleeve slidably mounted thereon to disconnect each of said plurality of female couplers and said connected male coupler;

and each of said locking sleeves being movable only in the one axial direction when each of said plurality of female couplers is to be connected to said male coupler axially aligned therewith and only in the opposite axial direction when each of said plurality of female couplers is to be disconnected from said male coupler axially aligned therewith.

2. The coupling device according to claim 1 in which said second support means includes:

first limit means for limiting relative axial movement between said second support means and each of said plurality of female couplers in one of the axial directions when each of said plurality of female couplers is to be connected to said male coupler axially aligned therewith;

second limit means for limiting relative axial movement between said second support means and each of said locking sleeves in the opposite axial direction when each of said plurality of female couplers is to be disconnected from said connected male coupler;

and said first limit means and said second limit means being axially spaced from each other.

3. The coupling device according to claim 2 in which said causing means includes force applying means for simultaneously applying a force to at least one of each of said plurality of female couplers and said male coupler aligned therewith only in the one axial direction for connection to each other and for simultaneously applying a force to at least one of each of said plurality of female couplers and said connected male coupler only in the opposite axial direction to cause relative movement at least between each of said plurality of female couplers and said locking sleeve slidably mounted thereon for disconnection of each of said plurality of female couplers and said connected male coupler.

4. The coupling device according to claim 3 in which said second support means includes a housing supporting said first limit means and said second limit means in axially spaced relation, said housing supporting each of said plurality of female couplers.

5. The coupling device according to claim 4 in which said force applying means includes means connected to said housing for causing movement of each of said plurality of female couplers only in the one axial direction by pushing on said housing and for causing movement of each of said plurality of female couplers only in the opposite axial direction by pulling on said housing to create relative axial movement between each of said plurality of female couplers and said locking sleeve slidably mounted thereon to disconnect each of said plurality of female couplers from said connected male coupler.

6. The coupling device according to claim 5 in which said housing includes:

a body having said connected means of said force applying means attached to one end thereof;

a nose piece connected to said body at its end opposite said connected means;

said body and said nose piece having a plurality of aligned bores equal in number to the number of said plurality of female couplers, each of 'said aligned bores having one of said plurality of female couplers therein;

each of said aligned bores in said body having a smaller inner diameter than each of said aligned bores in said nose piece to form a shoulder constituting said first limit means;

and said nose piece having means for engaging each of said locking sleeves, said engaging means constituting said second limit means.

7. The coupling device according to claim 6 in which:

said connected means of said force applying means includes a piston rod connected to said body of said housing for applying forces along the axis of each of said plurality of female couplers in each axial direction;

and said force applying means includes means for causing movement of said piston rod in each axial direction.

8. The coupling device according to claim 5 in which:

said connected means of said force applying means includes a piston rod connected to said housing and applying forces along the axis of each of said plurality of female couplers in each axial direction;

and said force applying means includes means for causing movement of said piston rod in each axial direction.

9. The coupling device according to claim 4 in which said force applying means includes a handle connected to said housing for causing movement of each of said plurality of female couplers in the one axial direction by pushing on said handle and movement of each of said plurality of female couplers in the other axial direction by pulling on said handle.

10. The coupling device according to claim 9 in which said housing includes:

a body having said handle attached to one end thereof;

a nose piece connected to said body at its end opposite said handle;

said body and said nose piece having a plurality of aligned bores equal in number to the number of said plurality of female couplers, each of said aligned bores having one of said plurality of female couplers therein;

each of said aligned bores in said body having a smaller inner diameter than each of said aligned bores in said nose piece to form a shoulder constituting said first limit means;

and said nose piece having means for engaging each of said locking sleeves, said engaging means constituting said second limit means.

11. The coupling device according to claim 4 in which said housing includes:

two separate portions connected to each other;

one of said two separate portions having a surface constituting said first limit means, said surface engaging each of said female couplers during connection;

and the other of said two separate portions having means for engaging each of said locking sleeves during disconnection, said engaging means constituting said second limit means.

12. The coupling device according to claim 2 in which said causing means includes force applying means for applying a force only in the one axial direction to said second support means to simultaneously apply a force to each of said plurality of female couplers only in the one axial direction for connection to said male coupler aligned therewith and for applying a force only in the opposite axial direction to said second support means to simultaneously apply a force to each of said plurality of female couplers only in the opposite axial direction to simultaneously disconnect each of said plurality of female couplers from said connected male coupler.

13. The coupling device according to claim 12 in which said second support means includes a housing supporting said first limit means and said second limit means in axially spaced relation, said housing supporting each of said plurality of female couplers.

14. The coupling device according to claim 13 in which said force applying means includes means connected to said housing for causing movement of each of said plurality of female couplers only in the one axial direction by pushing on said housing and for causing movement of each of said plurality of female couplers only in the opposite axial direction by pulling on said housing.

15. The coupling device according to claim 14 in which said housing includes:

a body having said connected means of said force applying means attached to one end thereof;

a nose piece connected to said body at its end opposite said connected means;

said body and said nose piece having a plurality of aligned bores equal in number to the number of said plurality of female couplers, each of said aligned bores having one of said plurality of female couplers therein;

each of said aligned bores in said body having a smaller inner diameter than each of said aligned bores in said nose piece to form a shoulder constituting said first limit means;

and said nose piece having means for engaging each of said locking sleeves, said engaging means constituting said second limit means.

16. The coupling device according to claim 14 in which:

said connected means of said force applying means includes a piston rod connected to said housing and applying forces along the axis of each of said plurality of female couplers in each axial direction;

and said force applying means includes means for causing movement of said piston rod in each axial direction.

17. The coupling device according to claim 13 in which said force applying means includes a handle connected to said housing for causing movement of each of said plurality of female couplers in the one axial direction by pushing on said handle and movement of each of said plurality of female couplers in the other axial direction by pulling on said handle.

18. The coupling device according to claim 2 in which said causing means includes force applying means for applying a force only in the one axial direction to said first support means to cause simultaneous movement only in the one axial direction of each of said male couplers supported by said first support means into engagement with one of each of said plurality of female couplers on said second support means to connect each of said plurality of female couplers and a corresponding one of said male couplers and for applying a force only in the opposite axial direction to said first support means to simultaneously cause relative movement only in the opposite axial direction between each of said plurality of female couplers and said connected male coupler and between each of said plurality of female couplers and said locking sleeve slidably mounted thereon to simultaneously disconnect each of said plurality of female couplers and said connected male coupler.

19. The coupling device according to claim 18 in which said force applying means of said causing means includes a handle connected to said first support means for causing movement of each of said female couplers in the one axial direction by pushing on said handle and movement of each of said female couplers in the other axial direction by pulling on said handle.

20. The coupling device according to claim 18 in which:
said force applying means of said causing means includes a piston rod connected to said first support means and applying forces along the axis of said male coupler; and means for causing movement of said piston rod in each axial direction.

21. The coupling device according to claim 2 including said movable one of said first support means and said second support means creating relative axial movement between said second support means and each of said locking sleeves slidably mounted on one of said plurality of female couplers when each of said plurality of female couplers is to be disconnected from said connected male coupler.

22. The coupling device according to claim 1 in which said causing means includes force applying means for simultaneously applying a force only in the one axial direction to said movable one of said first support means and said second support means to simultaneously move at least one of each of said plurality of female couplers and said male coupler aligned therewith only in the one axial direction for connection to each other and for simultaneously applying a force only in the opposite axial direction to said movable one of said first support means and said second support means to simultaneously move only in the opposite axial direction at least each of said locking sleeves slidably mounted on said plurality of female couplers to cause relative movement at least between each of said plurality of female couplers and said locking sleeve slidably mounted thereon for disconnection of each of said plurality of female couplers and said connected male coupler.

23. The coupling device according to claim 22 in which:
said force applying means includes a piston rod connected to said movable one of said first support means and said second support means for applying a force only in the one axial direction to simultaneously connect each of said female couplers and said male coupler axially aligned therewith and only in the opposite axial direction to simultaneously disconnect each of said female couplers and said male coupler axially aligned therewith;
and said force applying means includes means for causing movement of said piston rod only in each axial direction.

24. The coupling device according to claim 1 including said movable one of said first support means and said second support means creating relative axial movement between said second support means and each of said locking sleeves slidably mounted on one of said plurality of female couplers when each of said plurality of female couplers is to be disconnected from said connected male coupler.

25. The coupling device according to claim 1 in which said causing means includes force applying means for simultaneously applying a force to at least one of each of said plurality of female couplers and said male coupler aligned therewith only in the one axial direction for connection to each other and for simultaneously applying a force to at least one of each of said plurality of female couplers and said connected male coupler only in the opposite axial direction to cause relative movement at least between each of said plurality of female couplers and said locking sleeve slidably mounted thereon for disconnection of each of said plurality of female couplers and said connected male coupler.

26. A coupling device for connecting a plurality of first fluid conduits to a corresponding plurality of second fluid conduits and for disconnecting them from each other including:

a plurality of male couplers, each of said plurality of male couplers communicating with one of the plurality of first fluid conduits;

a plurality of female couplers equal in number to the number of said plurality of male couplers, each of said plurality of female couplers communicating with one of the plurality of second fluid conduits;

each of said plurality of female couplers having a locking sleeve slidably mounted thereon for relative axial movement between said locking sleeve and said female coupler on which said locking sleeve is slidably mounted when each of said plurality of female couplers is to be disconnected from said connected male coupler;

first support means for supporting said plurality of male couplers in substantially parallel axial relation to each other;

second support means for supporting said plurality of female couplers in substantially parallel axial relation to each other;

said second support means supporting each of said plurality of female couplers for enabling only relative axial movement between said second support means and each of said plurality of female couplers in either axial direction and for enabling relative axial movement between said second support means and each of said plurality of locking sleeves in the same axial direction as said female coupler on which said locking sleeve is slidably mounted;

and force applying means for simultaneously applying a force to at least one of each of said plurality of female couplers and said male coupler aligned therewith only in one axial direction to cause engagement between each of said plurality of female couplers and said male coupler axially aligned therewith to connect them together and for simultaneously applying a force to at least one of each of said plurality of female couplers and said connected male coupler only in the opposite axial direction to cause relative axial movement at least between each of said plurality of female couplers and said locking sleeve slidably mounted thereon to disconnect each of said plurality of female couplers and said connected male coupler;

and each of said locking sleeves being movable only in the one axial direction when each of said plurality of female couplers is to be connected to said male coupler axially aligned therewith and only in the opposite axial direction when each of said plurality of female couplers is to be disconnected from said male coupler axially aligned therewith.

* * * * *

UNITED STATES PATENT AND TRADEMARK OFFICE
CERTIFICATE OF CORRECTION

PATENT NO. : 6,341,803 B1
DATED : January 29, 2002
INVENTOR(S) : Clifford W. Allen, III et al.

It is certified that error appears in the above-identified patent and that said Letters Patent is hereby corrected as shown below:

<u>Column 9,</u>
Line 34, "plurality" (first occurrence) should read -- a plurality --

<u>Column 11,</u>
Line 7, cancel the apostrophe

Signed and Sealed this

Seventh Day of May, 2002

*Attest:*

*Attesting Officer*

JAMES E. ROGAN
*Director of the United States Patent and Trademark Office*